United States Patent
Sanders et al.

(10) Patent No.: US 10,759,154 B2
(45) Date of Patent: Sep. 1, 2020

(54) FOIL DEPOSITION

(71) Applicant: Hewlett-Packard Development Company, L.P., Houston, TX (US)

(72) Inventors: Itsik Sanders, Ness Ziona (IL); Erez Heldy, Ness Ziona (IL); Tzvika Fiksman, Ness Ziona (IL); Itay Rozen, Ness Ziona (IL); Ilan Meiri, Yavne (IL); Ofer Hollenberg, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 120 days.

(21) Appl. No.: 15/892,108

(22) Filed: Feb. 8, 2018

(65) Prior Publication Data
US 2019/0240964 A1    Aug. 8, 2019

(51) Int. Cl.
| | | |
|---|---|---|
| *B32B 37/10* | (2006.01) | |
| *B26F 1/40* | (2006.01) | |
| *B41F 19/00* | (2006.01) | |
| *B32B 37/00* | (2006.01) | |
| *B32B 37/12* | (2006.01) | |
| *B32B 38/10* | (2006.01) | |
| *B41F 16/00* | (2006.01) | |

(52) U.S. Cl.
CPC ............ *B32B 37/1045* (2013.01); *B26F 1/40* (2013.01); *B32B 37/025* (2013.01); *B41F 19/001* (2013.01); *B41F 19/005* (2013.01); *B32B 37/12* (2013.01); *B32B 38/10* (2013.01); *B41F 16/006* (2013.01); *B41F 16/0026* (2013.01)

(58) Field of Classification Search
CPC ...... B26F 1/40; B41F 16/0026; B41F 16/006; B41F 19/001; B41F 19/005; B32B 37/025; B32B 37/1045; B32B 37/12; B32B 38/10

USPC .......................................... 156/387, 391, 449
See application file for complete search history.

(56) References Cited

U.S. PATENT DOCUMENTS

| | | | |
|---|---|---|---|
| 8,839,737 B2 | 9/2014 | Weber | |
| 9,358,776 B2 | 6/2016 | King | |
| 9,656,455 B2 | 5/2017 | Sun | |
| 9,694,573 B2 * | 7/2017 | DeBard | ............... B41F 19/001 |
| 2007/0212490 A1 * | 9/2007 | Preisner | ................... B41M 1/24 |
| | | | 427/288 |
| 2007/0212590 A1 * | 9/2007 | Preisner | ................... C22C 5/04 |
| | | | 429/483 |

FOREIGN PATENT DOCUMENTS

EP    3016804    4/2017

OTHER PUBLICATIONS

English translation of WO2015000799 (also EP3016804).*
Patent Family of EP3016804.*
English translation of WO2005100035.*

* cited by examiner

*Primary Examiner* — Sonya M Sengupta
(74) *Attorney, Agent, or Firm* — Michael A Dryja

(57) ABSTRACT

There is disclosed a web transfer apparatus including a web transfer roller to advance a web, a foil transfer roller to advance a foil, and a movable curing unit. The foil transfer roller is movable between a first position and a second position. In the first position, the foil transfer roller is to press the foil against the web and in the second position the foil transfer roller is to disengage the foil from the web. The movable curing unit may comprise a curing device and may be movable between a first position adjacent to the web and a second position remote from the web.

15 Claims, 12 Drawing Sheets

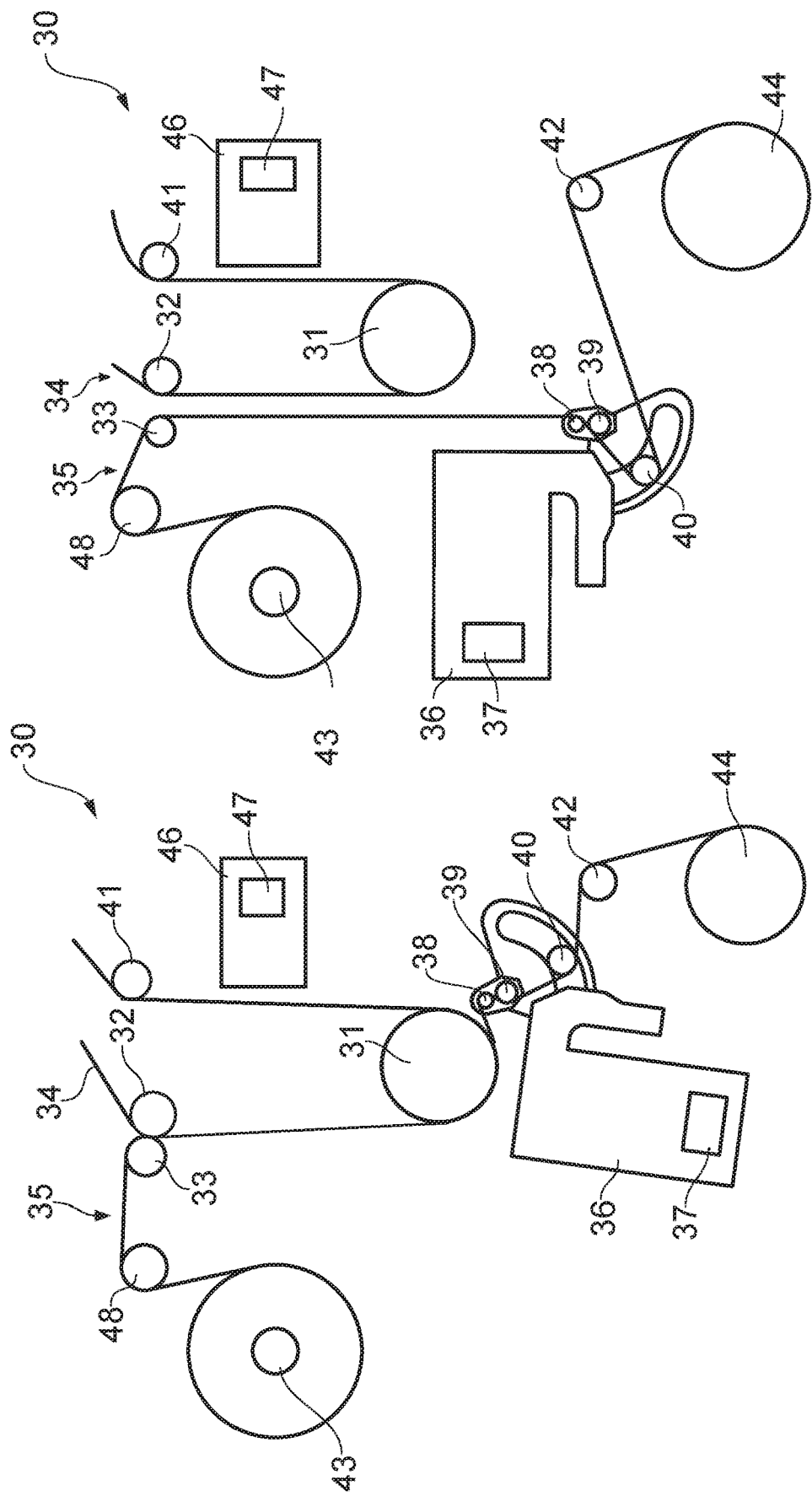

FOIL DEPOSITION

BACKGROUND

A foil layer may be deposited onto a web or sheet, for example to print a label.

BRIEF DESCRIPTION OF DRAWINGS

Examples will now be described with reference to the accompanying drawings, in which:

FIGS. 8A and 8B are simplified schematic representations of an example foil engage system;

DETAILED DESCRIPTION

In some examples of web transfer apparatus, a foil layer may be deposited onto a web. Foils may be difficult to handle, and threading an apparatus with a foil and a web may be time consuming and difficult.

Figure 1A:
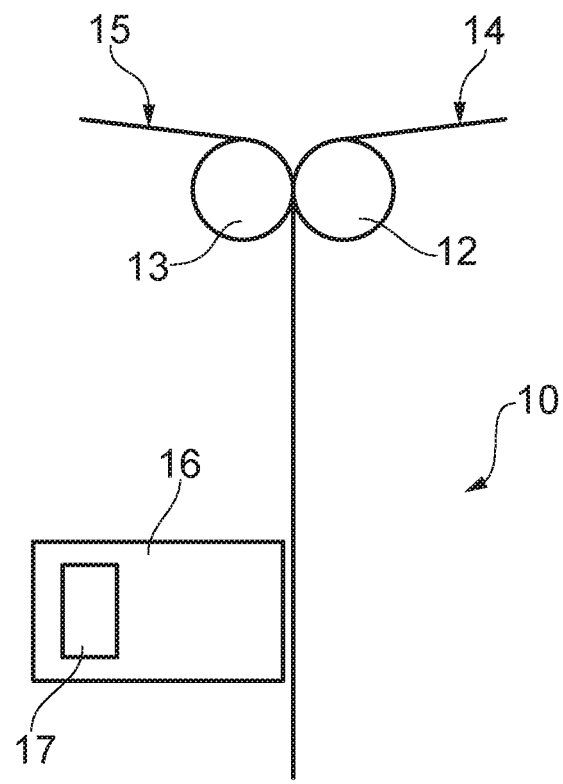
FIGS. 1A and 1B are simplified schematic representations of an example web transfer apparatus.
Figure 1B:
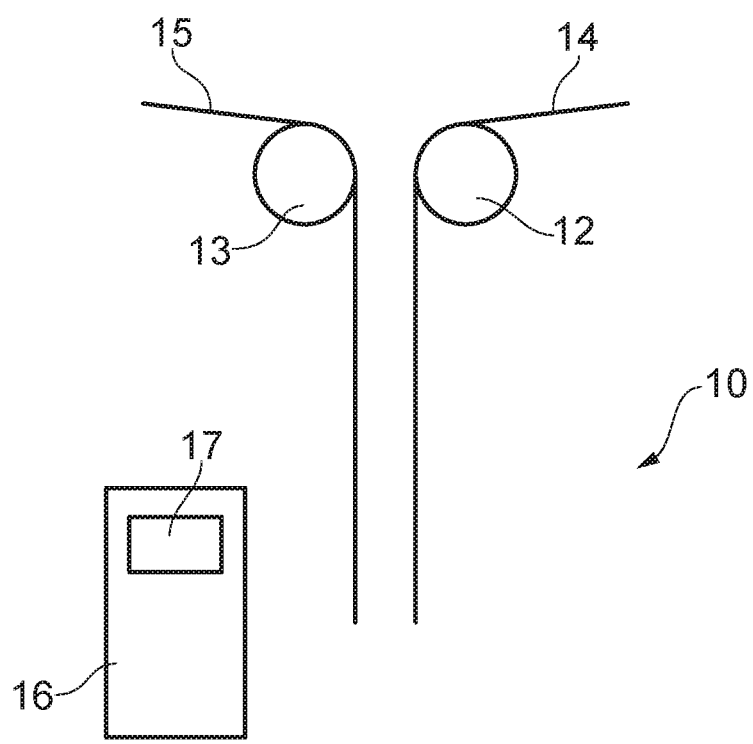

FIGS. 1A and 1B schematically show an example web transfer apparatus 10. Web transfer apparatus 10 comprises a web transfer roller 12 and a foil transfer roller 13. In use of the apparatus 10, the web transfer roller 12 advances a web 14 (which in the context is any elongate substrate, which may for example be supplied in roll form) and foil transfer roller 13 advances a foil 15. A foil may for example comprise a thin sheet or web of metal, pigment or other solid marking material, in some examples comprising a textured surface, any may be supplied as a coating on a backing sheet or web. The foil transfer roller 13 is movable between a first position (shown in FIG. 1A) and a second position (shown in FIG. 1B). In use of the apparatus 10, the foil transfer roller 13 presses the foil 15 against the web 14 when in the first position, as shown in FIG. 1A. When in the second position (shown in FIG. 1B), the foil transfer roller 13 disengages the foil 15 from the web 14.

The web transfer apparatus 10 further comprises a movable curing unit 16 comprising a curing device 17. The movable curing unit 16 is movable between a first position (shown in FIG. 1A) and a second position (shown in FIG. 1B). In the first position the movable curing unit 16 is adjacent the web 14 and in the second position the movable curing unit 16 is remote from the web 14.

The curing device 17 may for example comprise a UV source, for example a UV lamp. When in its first position proximate the web the movable curing unit 16 utilises curing device 17 to cure at least part of the foil 15 to the web 14.

When in its first position, the foil transfer roller 13 creates a nip with the web transfer roller 12 to press the foil 15 to the web 14. This may occur before curing to adhere the foil 15 to the web 14. The nip force may be adjustable.

In some examples, the foil 15 comprises two layers. The foil 15 may comprise a releasable foil layer to adhere to the web 14, and a nonreleasable foil layer (for example, a backing layer or web). Releasable foil layer and nonreleasable foil layer may be advanced by the foil transfer roller 13. The foil layers may be pressed together, and pressed to the web, by a nip created by the foil transfer roller 13 (when in its first position) and the web transfer roller 12, as shown in FIG. 1A. To adhere a releasable foil layer to the web 14, an adhesive may be applied to the web 14, for example upstream of web transfer roller 12.

Foil may be easily replaced since the foil transfer roller 13 may be moved to a second position in which it does not press web 14 to foil 15. Web 14 may be fed through the apparatus without being pressed to the foil 15, by moving the foil transfer roller 13 to its second position. Foil may also be fed through the apparatus on its own (without being pressed to the web 14) by moving the foil transfer roller 13 to its second position. Web or foil may therefore be fed through the apparatus selectively independently of each other, or so as to result in a foil layer being transferred to the web without any cutting of the web or foil and therefore without any waste. Compared to other web transfer apparatus, in which the foil (which can be difficult to handle) may be cut when it is not to be applied to the web, and rethreaded into the apparatus when application is to resume, the apparatus of FIG. 1 may be easier to use and more versatile in operation.

The paths of the foil and web may be reversed. For example, the foil transfer roller 13 may be moved to its second position where it does not press web 14 to foil 15 and then the foil and web transfer rollers may be rotated in an opposite direction to reverse the direction of the foil path, and the web path. Since no foil may be pressed to the web when the foil transfer roller is in its second position the rollers may be rewound without risk of compromising the foil and web. In one example the foil transfer roller, or the web transfer roller, may be individually rewound.

The apparatus 10 may cure the foil 15 to web 14. Curing the foil 15 to web 14 may be performed by movable curing unit 16. To carry out 'spot-curing', the foil transfer roller may be moved to its second position in which it disengages the foil 15 from web 14 and the web 14 may advance on a web path proximate a further curing unit. Any deposition on the web may therefore be cured to the web by the further curing unit, and this may be performed in the absence of any foil on the web. Therefore a deposition, for example a varnish, may be cured to the web with no foil attached, and this may be performed by apparatus 10 without any need to cut the foil to prevent the foil being transferred to the web, and in some examples to subsequently rethread the foil.

The rollers of the web transfer apparatus 10 may be replaceable.

Figure 2A:
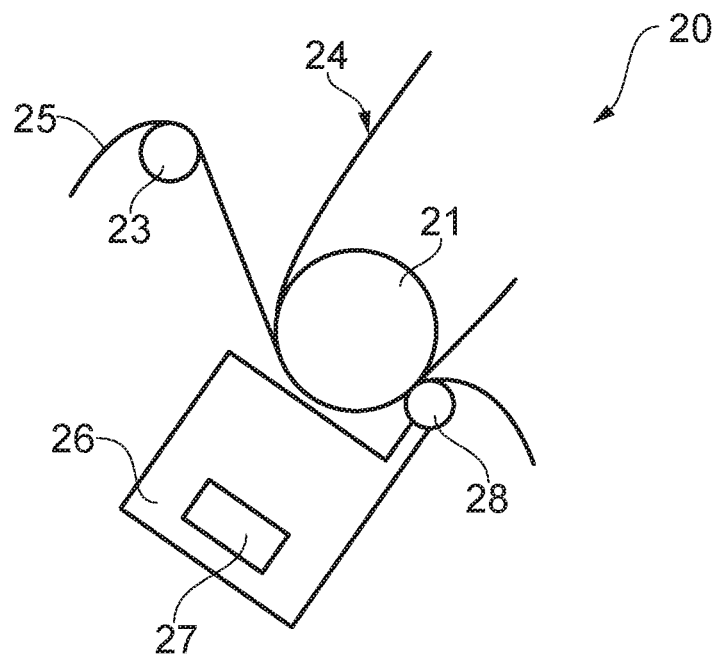
FIGS. 2A and 2B are simplified schematic representations of an example foil deposition apparatus.
Figure 2B:
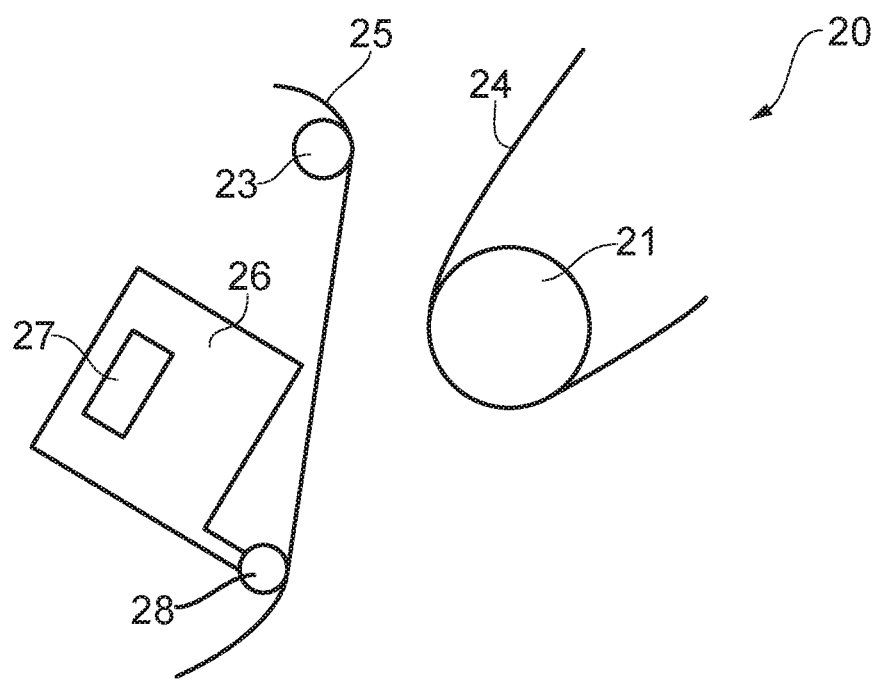

FIGS. 2A and 2B schematically show an example foil deposition apparatus 20. Foil deposition apparatus 20 comprises a web transfer roller 21 and a foil transfer roller 23. Web transfer roller 21 is to drive a web 24 on a web path and foil transfer roller 23 is to drive a foil 25 on a foil path.

Foil deposition apparatus 20 comprises a movable curing unit 26, which comprises a curing device 27 and a foil driving unit 28. Movable curing unit 26 is movable between a first position (shown in FIG. 2A) and a second position (shown in FIG. 2B). In the first position, the foil driving unit 28 is to drive the foil on a first path that converges to the web path and in the second position the foil driving unit 28 is to drive the foil on a second path which diverges from the web path.

The curing device 27 may comprise a UV source, for example a UV lamp. When in its first position proximate the web the movable curing unit 26, the utilising curing device 27, may cure at least part of the foil 25 to the web 24.

As described above, the foil 25 may comprise two layers: a releasable foil layer to adhere to the web 24, and a nonreleasable foil layer 25*a*. Releasable foil layer and nonreleasable foil layer may be advanced by the foil transfer unit 23. When the movable curing unit 26 is in its first position (shown in FIG. 2A), to advance the foil 25 on the first path converging to the web path, the foil driving unit 28 may be to advance the nonreleasable foil layer 25*a* on a path divergent to the path of the releasable foil layer. The foil driving unit 28 may therefore be a peeler, serving to 'peel off' the nonreleasable foil layer 25*a*. In some examples, the foil driving unit 28 may comprise first and second peeler rollers and the nonreleasable foil layer may be advanced between the first and second peeler rollers of the foil driving unit 28 on a path divergent from the path of the releasable foil layer. The releasable foil layer may be transferred, and cured to the web at the movable curing unit 26 such that the releasable foil layer thereafter advances with the web. To adhere a releasable foil layer to the web 24, an adhesive may be applied to the web 24.

The foil transfer roller 23 may be movable between a first position and a second position. In the first position the foil transfer roller 23 is to press foil 25 against web 24. In the second position the foil transfer roller 23 is to disengage foil 25 from web 24.

When in its first position, the movable curing unit 26 may be proximate a web path and when in its second position may be remote from a web path.

The web transfer roller 21 may be heated, for example by a UV light or the like. In some examples, the web transfer roller 21 may be cooled, for example by providing feeding cooling water to the interior of the roller 21. Controlling the temperature may aid in the curing process, for example to assist the movable curing unit 26 in curing any adhesive applied to the web to cure the foil (or a releasable layer thereof) to the web.

Foil may be easily replaced since the movable curing unit 26 may be moved to its second position in which it drives the foil 25 on a path divergent from the web path. Web 24 may be fed through the apparatus on its own (without being pressed to or contacting the foil 25 as their paths are divergent when the movable curing unit 26 is in its second position) by moving the foil transfer roller 23 to its second position. Foil may also be fed through the apparatus on its own (without being pressed to the web 24) by moving the foil transfer roller 23 to its second position, as described in relation to FIGS. 1*a* and 1*b*.

The foil and web transfer rollers may be rewound. Since the movable curing unit 26 can be in a position where it drives foil 25 on a path divergent from the web path, no foil may be pressed, or transferred to, to the web when the foil transfer roller is in its second position. Rewinding the rollers may be performed without compromising the foil or the web.

The apparatus 20 may cure the foil 25 to web 24. Curing the foil 25 to web 24 is performed by movable curing unit 26. When in its first position, the first foil driving unit 28 drives the foil 25 on a path convergent to the web path and therefore transfer foil 25 to the web 24. The foil 25 is then cured to the web 24 by curing device 27.

To 'spot-cure', the movable curing unit 26 may be moved to its second position in which foil 25 is driven on a path divergent from the web path, and the web 24 may advance on a web path proximate a further curing unit. Any deposition on the web may therefore be cured to the web by the further curing unit, and this may be performed in the absence of any foil on the web. Therefore a deposition, for example a varnish, may be cured to the web with no foil attached, and this may be performed by apparatus 20 without any need to cut the foil to prevent the foil being transferred to the web.

The rollers of the apparatus 20 may be replaceable.

Figure 3:
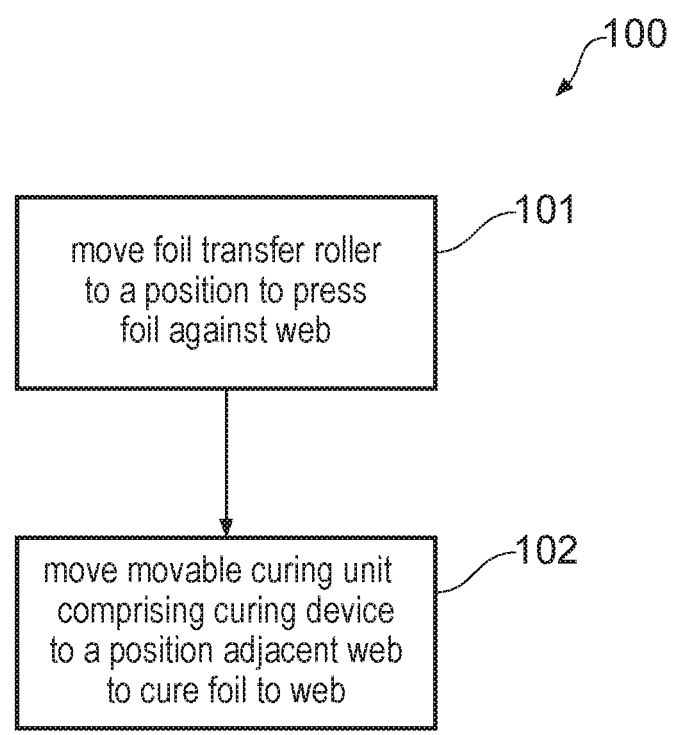
FIG. 3 is a flowchart of an example method.

FIG. 3 shows an example of a method 100. The method comprises blocks 101 and 102.

In block 101 a foil transfer roller for advancing a foil is moved to a position to press the foil against a web.

In block 102 a movable curing unit is moved to a position adjacent the web to cure the foil to the web.

Figure 4:
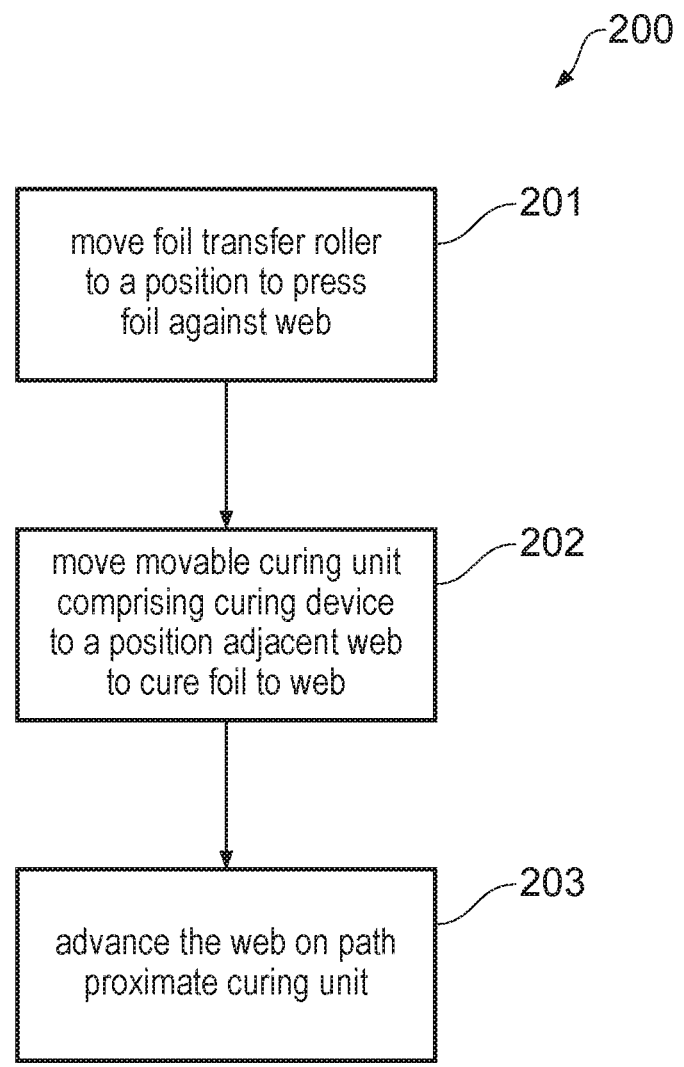
FIG. 4 is a flowchart of an example method.

FIG. 4 shows an example of a method 200. The method comprises blocks 201, 202, and 203.

In block 201 a foil transfer roller for advancing a foil is moved to a position to press the foil against a web.

In block 202 a movable curing unit is moved to a position adjacent the web to cure the foil to the web.

In block 203 the web is advanced on a web path proximate a curing unit. The curing unit may not be the same as the movable curing device. The curing unit may be provided downstream of the movable curing unit.

Figure 5:
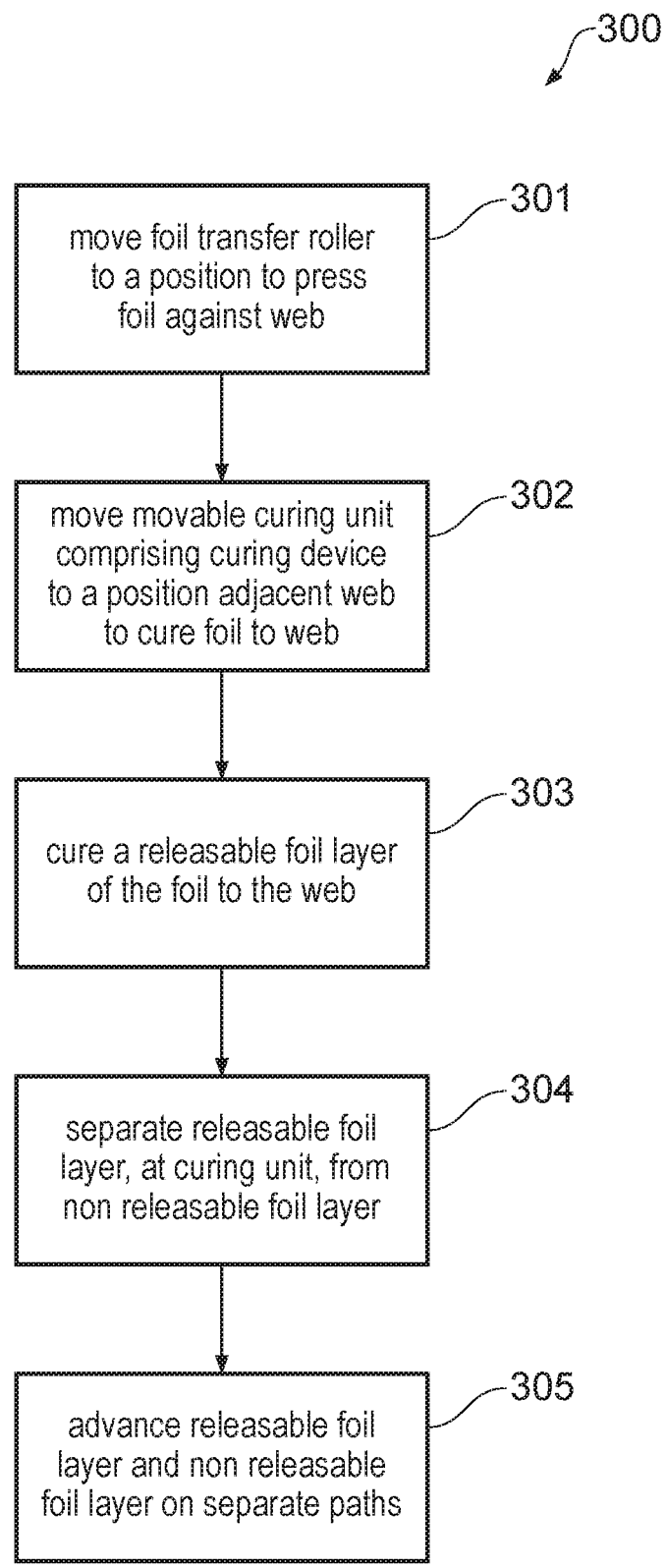
FIG. 5 is a flowchart of an example method.

FIG. 5 shows an example of a method 300. The method comprises blocks 301, 302, 303, 304, and 305.

In block 301 a foil transfer roller for advancing a foil is moved to a position to press the foil against a web.

In block 302 a movable curing unit is moved to a position adjacent the web to cure the foil to the web.

In block 303 a releasable foil layer of the foil is cured to the web.

In block 304 the releasable foil layer is separated at the movable curing unit from a nonreleasable foil layer of the foil.

In block 305 the releasable foil layer and the nonreleasable foil layer are advanced on separate paths.

Figure 6:
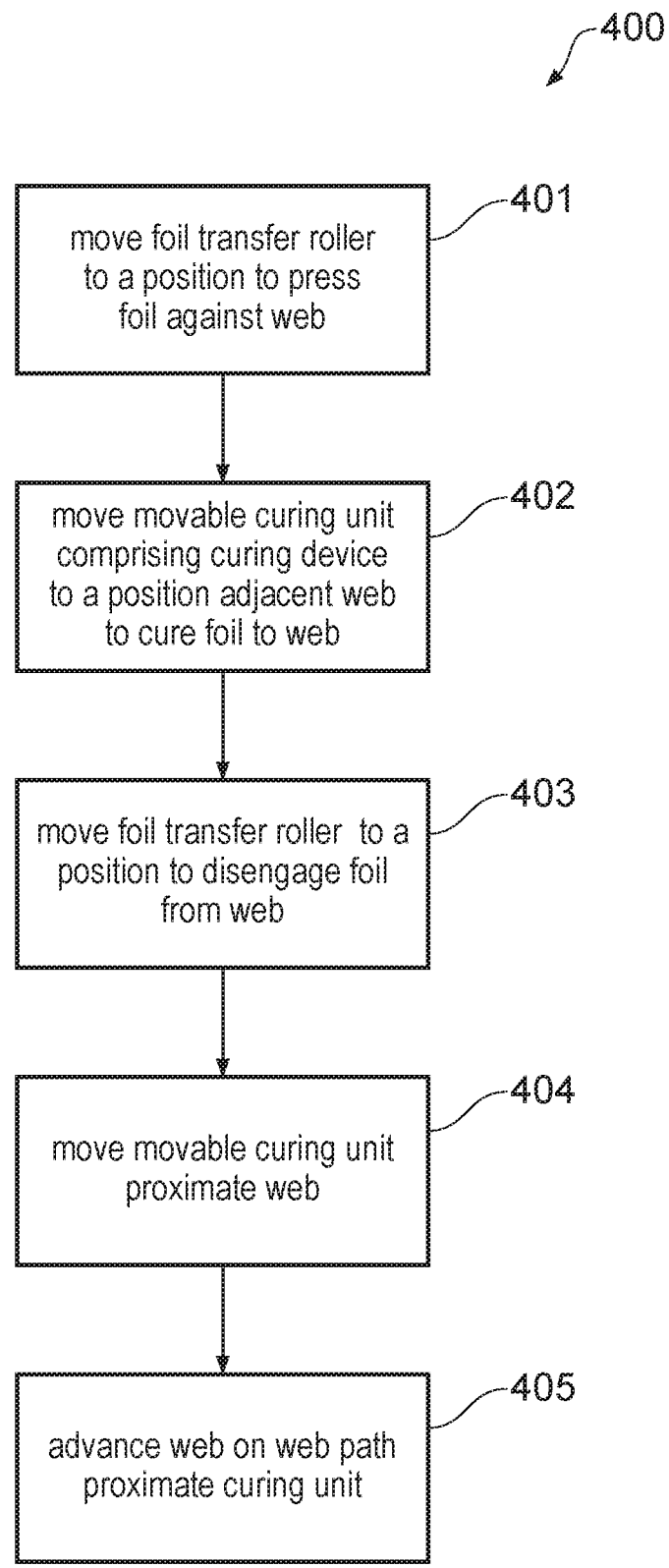
FIG. 6 is a flowchart of an example method.

FIG. 6 shows an example of a method 400. The method comprises blocks 401, 402, 403, 404, and 405.

In block 401 a foil transfer roller for advancing a foil is moved to a position to press the foil against a web.

In block 402 a movable curing unit is moved to a position adjacent the web to cure the foil to the web.

In block 403 the foil transfer roller is moved to a position to disengage the foil from the web.

In block 404 the movable curing unit is moved to a position remove from the web.

In block 405 the web is advanced on a web path proximate a curing unit. The curing unit may not be the same as the movable curing device. The curing unit may be provided downstream of the movable curing unit.

Figure 7:
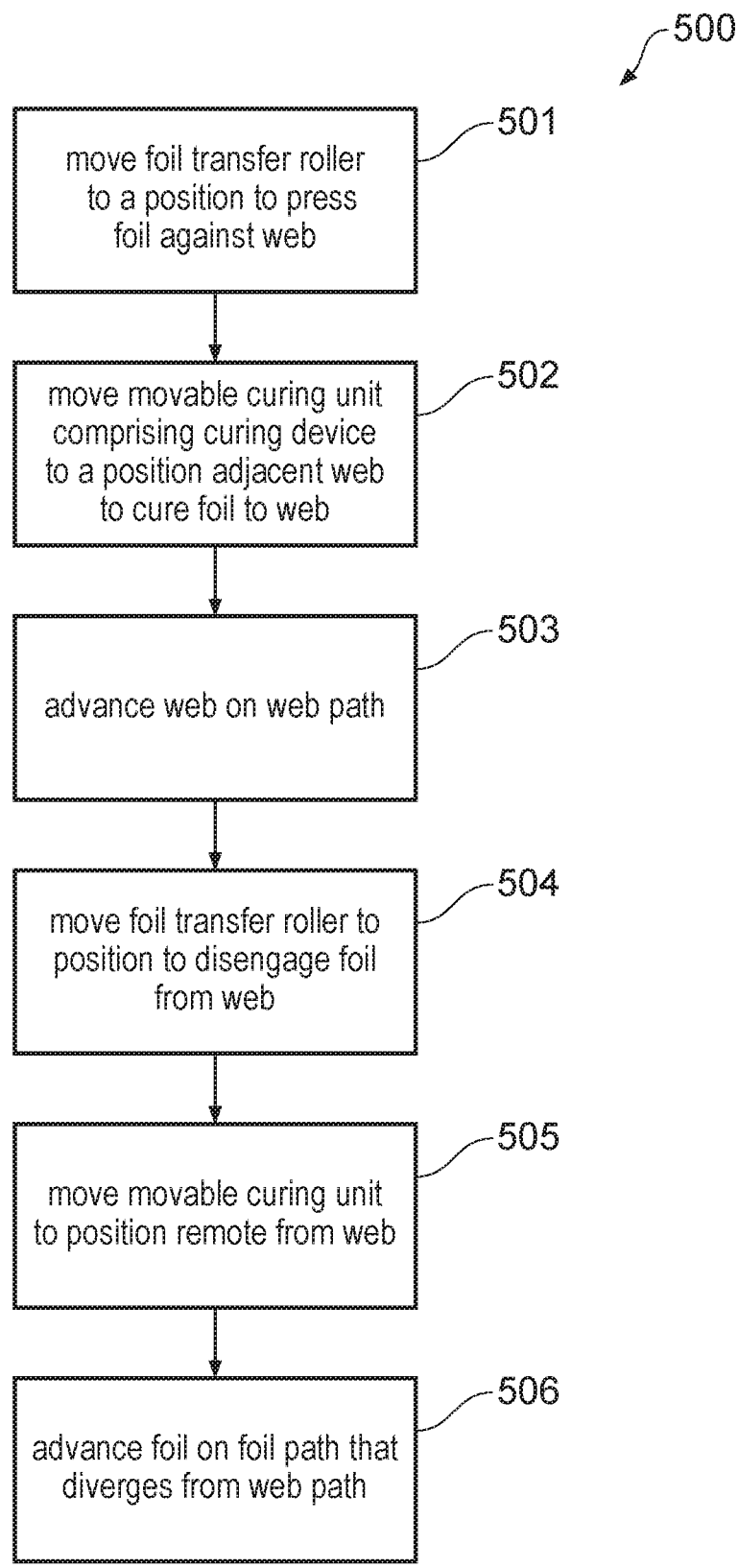
FIG. 7 is a flowchart of an example method.

FIG. 7 shows an example of a method 500. The method comprises blocks 501, 502, 503, 504, 505, and 506.

In block 501 a foil transfer roller for advancing a foil is moved to a position to press the foil against a web.

In block 502 a movable curing unit is moved to a position adjacent the web to cure the foil to the web.

In block 503 the web is advanced on a web path.

In block 504 the foil transfer roller is moved to a position to disengage the foil from the web.

In block 505 the movable curing unit is moved to a position remote from the web.

In block 506 the foil is advanced on a foil path that diverges from the web path.

FIGS. 8A and 8B show, schematically, another example of a foil engage system 30. FIGS. 8A and 8B show the foil engage system 30 in a first configuration and a second configuration respectively. In use of the foil engage system 30, when in the first configuration as shown in FIG. 8A, a foil engage system 30 presses a foil against a web, cures a releasable foil layer of the foil to the web, and separates the releasable foil layer from a nonreleasable foil layer of the foil by advancing the nonreleasable foil layer on a path divergent from the path of the releasable foil layer. In the second configuration shown in FIG. 8B, the foil engage system 30 disengages a foil from a web, and the web is advanced on a web path divergent from a foil path. The web may then be cured, for example a varnish applied to the web may be cured, without any foil being transferred to the web.

The system 30 in this example comprises a foil unwind roller 43. In use of the apparatus, the foil 35 is unwound from the unwind roller 43 by a first foil transfer roller 48 which advances the foil 35 on a foil path. The system 30 further comprises a second foil transfer roller 33 downstream of the first transfer roller 48. The second foil transfer roller 33 advances the foil 35 on the foil path. The system 30 further comprises a first web transfer roller 32 which advances a web 34 on a web path. A counter roller 31 is located downstream of first web transfer roller 32 and advances the web 34 on the web path. In some examples, the counter roller 31 may be cooled, for example by feeding water into the counter roller 31.

In this example, the system 30 further comprises a movable curing unit 36 comprising a curing device 37. The movable curing unit 36 in this example comprises a foil driving unit comprising a third transfer roller 38 and fourth transfer roller 39. Together, transfer rollers 38, 39 form a peeler and are engageable to form a nip. The movable curing unit 36 further comprises a fifth transfer roller 40. In use of the apparatus, the third, fourth, and fifth transfer rollers 38, 39, 40 advance a nonreleasable foil layer of foil 35. Fifth transfer roller 40 has an adjustable position in this example, and movement of the fifth transfer roller 40 adjusts the nip force between rollers 38, 39 and will change the direction of the foil path.

In this example, the system 30 comprises sixth foil transfer roller 42 to advance a nonreleasable foil layer of foil 35. A rewind roller 44 is provided to collect foil 35 that has advanced through the system 30. Rewind roller 44 may collect a nonreleasable foil layer of foil 35.

The system 30 in this example comprises a curing unit 46 proximate the web path and comprising a curing device 47.

The system 30 in this example comprises a third web transfer roller 41 to advance the web 34 on the web path.

The second foil transfer roller 33 is movable between a first position (shown in FIG. 8A) to a second position (shown in FIG. 8B). In the first position, the second foil transfer roller 33 presses the foil 35 to the web 34. The second foil transfer roller 33, in the first position, and first web transfer roller 32 create a nip to press foil 35 to web 34. In the second position, the foil transfer roller 33 disengages foil 35 from web 34.

In this example, the movable curing unit 36 is movable between a first position (shown in FIG. 8A) and a second position (shown in FIG. 8B). In the first position, movable curing unit 36 is adjacent the web 34 and the third foil transfer roller 38 drives the foil 35 on a first path that converges to the web path. In the second position, movable curing unit 36 is remote from the web 34 and third foil transfer roller 38 drives the foil 35 on a second path that diverges from the web path.

In the first configuration (FIG. 8A), foil 35 is advanced from unwind roller 43 by the first foil transfer roller 48 and the second foil transfer roller 33 on a foil path. The web 34 is then advanced by a first web transfer roller 32. Web 34 may have an adhesive applied, for example upstream of web transfer roller 32. The second foil transfer roller 33 is in a first position in which it advances foil 35 on foil path, and presses the foil 35 against the web 34. The second foil transfer roller 33 and the first web transfer roller 32 form a nip to press foil 35 against web 34. The foil 35 and web 34 together advance on a common path from transfer rollers 33, 32 to the counter roller 31. A releasable layer of the foil may thereby be adhered to the web 34.

At the counter roller 31, the foil 35 and web 34 advance on a path proximate to the movable curing unit 36, which is in its first position adjacent the web 34. A curing device 37 of the movable curing unit 36 cures the foil 35 (or a releasable layer thereof) to the web 34. Curing the releasable foil layer to the web 34 may dry any adhesive previously applied to the web.

The foil 35 is peeled at the peeler comprising third and fourth transfer rollers 38, 39. The releasable and nonreleasable foil layers of foil 35 are separated at the peeler. Once cured to the web 34 by movable curing unit 36, the releasable foil layer may be fully adhered to the web 34 and may advance with the web on a web path (past curing unit 46 and toward third web transfer unit 41). The nonreleasable foil layer is advanced between third and fourth transfer rollers 38, 39, via the fifth transfer roller 40 (which may be an idler roller, which does not actively drive a foil or a web). The sixth transfer roller 42 advances the nonreleasable foil layer to be wound on rewind roller 44.

The releasable foil layer, after being transferred and cured to web 34, is advanced past curing unit 46 comprising curing device 47. Curing unit 46 may not be operational, or may not be switched on, at this time. Third web transfer roller 41 advances web 34 with releasable foil layer attached and cured.

FIG. 8B shows system 30 in a second configuration in which a releasable foil layer of foil 35 is not be transferred and cured to web 34.

In the second configuration, in use of the system 30, foil 35 is advanced from the unwind roller 43 by the first foil transfer roller 48 and the second foil transfer roller 33 on a foil path. The web 34 is advanced from first web transfer roller 32. The web 34 may have a deposition on its surface to be cured, for example ink or varnish. The second foil transfer roller 33 is in a second position and advances the foil 35 on the foil path, disengaging the foil 35 from web 34. In contrast to the configuration shown in FIG. 8A, no nip is formed between the second foil transfer roller 33 and the first web transfer roller 32.

The web 34 is advanced on a web path via the counter roller 31 past the curing unit 46 which cures the deposition to the web 34. For example, ink or varnish previously applied to the web may be cured by curing device 47 of curing unit 46 as the web 34 advances on the web path past the curing unit 46. The third web transfer roller 41 then continues to advance the web, with ink cured to its surface, on the web path.

Movable curing unit 36 is in its second position, in which it is relatively remote from web 34 (compared to the first position) and the third foil transfer roller 38 is operable to drive foil 35 on a path that diverges from the web path.

The foil 35 is not be transferred to web 34 when the system is in this configuration, and is instead advanced by the third transfer roller 38 to proximate to the movable curing unit 36 which may be switched off or not operational. Foil 35 may not be cured by the movable curing unit 36. Foil may advance between third and fourth transfer rollers 38, 39. The releasable and nonreleasable foil layers of foil 35 may not be separated. Foil 35 is advanced, via fifth roller 40, which may be an idler roller, by sixth foil transfer roller 42 to foil rewind roller 44. Fifth roller 40 is movable in this example and movement of the fifth roller 40 adjusts the nip force created by rollers 38 and 39.

Two or more systems 30 may be provided in one example print apparatus. The movable curing unit 46 may be moved with second foil transfer roller 33. Movable curing unit 46 and second foil transfer roller 33 may be controlled by a single control system. Movable curing unit 46 may be moved by a single control system at the same time as second foil transfer roller 33. The movable curing unit 46 and second foil transfer roller 33 may be actuated to move between their respective first and second positions together.

In one example, the counter roller 31 may have a mass of 3.6 kg, and a moment of inertia of 0.028 kgm². In use, the system 30 may place the foil under tension of between 2 and 5 kg, and the web under tension of between 1 and 15 kg. The system 30 in use may accelerate the web to a maximum of 1.5 m/s². Rollers 38 and 39 may have a parallelism of 150 μm/m.

Figure 9A:
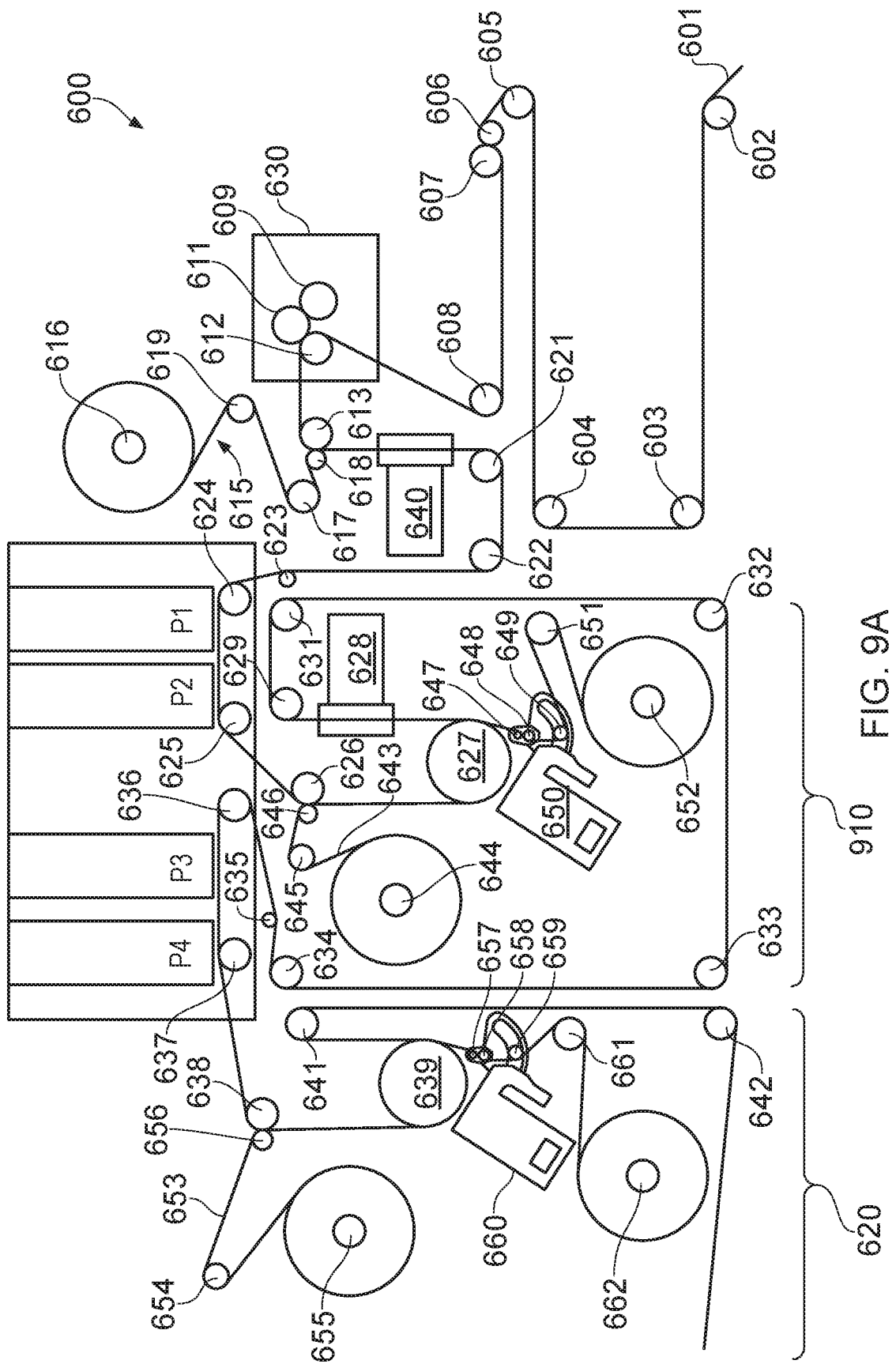
FIGS. 9A and 9B are simplified schematic representations of an example print apparatus.
Figure 9B:
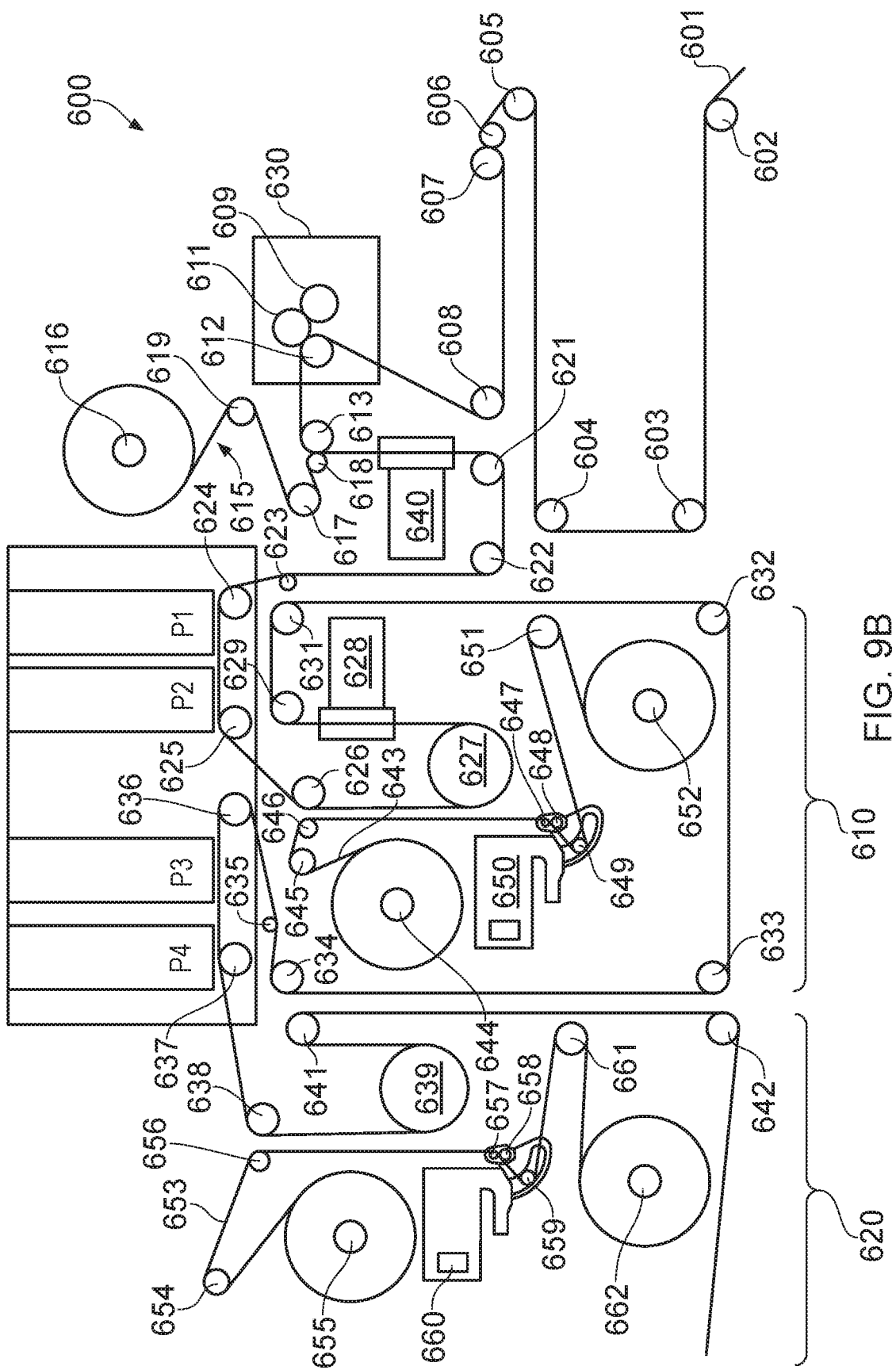

FIGS. 9A and 9B show, schematically, an example print apparatus 600. The apparatus 600 comprises a first foil engage system 610 and a second foil engage system 620. Foil engage systems 610, 620 in use of the apparatus 600, transfer a foil to a web.

In use of the print apparatus 600, a web 601 may be advanced on a web path via web transfer rollers 602-608 to a finishing unit 630, which may comprise a gloss and/or matt unit. The finishing unit 630 in this example comprises web transfer roller 612 to advance web 601 on the web path. A fluid application roller 609 transfers a fluid from a fluid reservoir to fluid transfer roller 611. The fluid may be selected so as result in a gloss finish or a matt finish. Fluid transfer roller 611 transfers fluid to the web 601 when the web 601 is advanced by the roller 612 between the fluid transfer roller 611 and the web transfer roller 612, which form a nip.

Web transfer roller 613 then continues to advance the web 601 on a web path.

In this example a lamination unit provides a lamination 615 on a lamination unwind roller 616. If the web is to be laminated, lamination 615 is unwound from lamination unwind roller 616 and advanced by lamination transfer rollers 617, 618, and 619. A nip is created by the lamination transfer roller 618 and the web transfer roller 613 and lamination 615 is transferred to web 601 by the lamination transfer roller 618. In this example, a curing unit 640 is provided to cure any lamination applied to web 601.

In some use cases, it may be that no lamination is to be applied to the web 601 and so the web 601 may be advanced directly from web transfer roller 612 to web transfer roller 624 thereby bypassing any rollers to laminate the web.

Web transfer rollers 621 and 622 advance the web 601 (which may or may not be laminated) to a further web transfer roller 624. In this example, an idler roller 623 provides appropriate tensioning and influences the direction of the web 601.

Web transfer rollers 624 and 625 advance the web 601 proximate to a first printing unit, in which example print bars P1 and P2. In one example, at print bar P1 or P2, an ink may be deposited onto the web 601. In another example, an adhesive may be deposited onto the web 601 at P1 or P2.

Web transfer roller 625 advances web 601 to the first foil engage system 610.

At the first foil engage system 610, the web 601 is advanced by web transfer rollers 626 and 627 on a path past a curing unit 628. In use of the apparatus 600, the curing unit 628 may cure web 601. For example, curing unit 628 may cure a deposition, deposited onto the web at one of print bars P1 or P2, to the web 601.

The web transfer rollers 629, 631, 632, 633, 634 advance the web 601 to web transfer roller 636, and the idler roller 635 provides appropriate tensioning and direction to the web 601.

Web transfer rollers 636 and 637 advance the web 601 proximate a second printing unit, in this example comprising print bars P3 and P4. At one of print bars P3, P4, an ink may be deposited onto the web 601. In one example, an adhesive may be deposited onto the web 601.

Web transfer roller 637 advances the web 601 to the second foil engage system 620.

At the second foil engage system 620 web 601 is advanced by the web transfer rollers 638, 639, 641, and 642.

First foil engage system 610 receives a first foil 643 which may be disposed around a first foil unwind roller 644. The first foil 643 is be advanced by foil transfer rollers 645 and 646. A first movable curing unit 650 comprises foil transfer rollers 647, 648, and 649 to advance the foil 643 to the foil transfer roller 651, which in turn advances the first foil 643 to be collected onto a first foil rewind roller 652.

The first foil 643 may comprise a releasable foil layer and a nonreleasable foil layer. At the first foil engage system 610, foil 643 is transferred to web 601. At the first foil engage system 610 releasable foil layer of foil 643 may be transferred to web 601.

The foil transfer roller 646 is movable between a first position (shown in FIG. 9A) and a second position (shown in FIG. 9B). In the first position the foil transfer roller 646 is to press the foil 643 against the web 601. In the second position the foil transfer roller 646 is to disengage the foil 643 from the web 601.

An adhesive applied to the web, e.g. at print bar P1 or P2 adheres foil 643 to web 601. Foil transfer roller 646 and web transfer roller 626 may create a nip.

Foil transfer roller 647 may be to advance the foil 643. The movable curing unit 650 is movable between a first position (shown in FIG. 9A) and a second position (shown in FIG. 9B). When in its first position the foil transfer roller 647 is to drive the foil on a first path that converges to the web path and in its second position the foil transfer roller 647 is to drive the foil on a second path that diverges from the web path.

In the first configuration of the print apparatus 600, releasable foil layer may be adhered to the web 601 on passing through a nip formed by rollers 647 and 627. The nonreleasable foil layer of foil 643 is advanced by roller 651 to be collected at first rewind 652.

The web 601 may therefore advance from first foil engage system 610 to second foil engage system 620 with a foil layer already adhered to the web 601.

The second foil engage system 620 receives a second foil 653 which is disposed around a second foil unwind roller 655. The second foil 653 is advanced by foil transfer rollers 654 and 656. A second movable curing unit 660 comprises foil transfer rollers 657, 658, and 659 to advance the second foil 653 to a foil transfer roller 661, and to be collected onto a second foil rewind 662.

The second foil 653 may comprise a releasable foil layer and a nonreleasable foil layer. At the second foil engage system 620, foil the second 653 (or in some examples, a releasable foil layer thereof) may be transferred to web 601. The foil transfer roller 656 is movable between a first position (shown in FIG. 9A) and a second position (shown in FIG. 9B). In the first position the foil transfer roller 656 presses the foil 653 against the web 601. In the second position, the foil transfer roller 656 disengages the foil 653 from the web 601.

In use of the apparatus, an adhesive may be applied to the web, for example at print bar P3 or P4, which causes the foil 653 to adhere to the web 601. The foil transfer roller 656 and the web transfer roller 638 create a nip for pressing the web 601 and the foil 643 together.

The foil transfer roller 657 advances the foil 653. The movable curing unit 660 is movable between the first position (shown in FIG. 9A) and the second position (shown in FIG. 9B). In the first position of the movable curing unit 660 the foil transfer roller 657 drives the foil on a first path that converges to the web path and in the second position the foil transfer roller 657 drives the foil on a second path that diverges from the web path.

In the first configuration of the print apparatus 600 a releasable foil layer may be adhered to the web 601. A nip may be formed by rollers 657 and 639 to adhere releasable foil layer to web 601. Releasable foil layer may advance with web 601 on a web path. Nonreleasable foil layer of foil 653 may be advanced by roller 661 to be collected at first rewind 662.

In one example, the web 601 may advance from second foil engage system 620 with two foil layers adhered to the web 601. In this example the first foil is transferred and cured at first foil engage system 610 and the second foil is transferred and cured at second foil engage system 620.

In one example, a web may advance through the print system 600 without any deposition of foil. In this example the foil transfer rollers 646 and 656 are moved to their second positions in which they do not engage the foil to the web 601. The movable curing units 650 and 660 are moved to their second positions in which they are remote from the web 601. The web 601 therefore advances on a web path in which no foil is pressed to the web, and any deposition deposited onto the web 601 (for example at print bar P1 or P2) is cured by curing unit 628.

In one example, no foil may be deposited onto the web 601 at the first foil engage system 610 but foil may be deposited onto the web 601 at the second foil engage system 620. In this example, the foil transfer 646 and the movable curing unit 650 are moved to their second positions, and the foil transfer unit 656 and the movable curing unit 660 are moved to their first positions.

The movable curing unit 650 and the movable transfer roller 646 may be controlled by a single control system. The movable curing unit 650 and the transfer roller 646 may be moved between their first and second positions by a single control system, and may be actuated to move at the same time. The movable curing unit 650 and the transfer roller 646 may be mechanically connected to one another. The movable curing unit 660 and the movable transfer roller 656 may be controlled by a single control system. The movable curing unit 660 and the transfer roller 656 may be moved between their first and second positions by a single control system, and may be actuated to move at the same time. The movable curing unit 660 and the transfer roller 656 may be mechanically connected to one another.

The print apparatus 600 may be used to print objects, for example labels. Print bars P1-P4 may apply a different colour ink. The foil unwind rollers 644 and 655 may each comprise a different foil, for example different coloured foils. The print apparatus 600 may therefore be to print a label comprising different coloured inks and different coloured foils.

The transfer rollers 644 and 656 may be moved to their second positions, and the movable curing units 650 and 660 may be moved to their second positions for a case and cure process, or to fix a foil or web jam, or to process a label with no foil.

Figure 10:
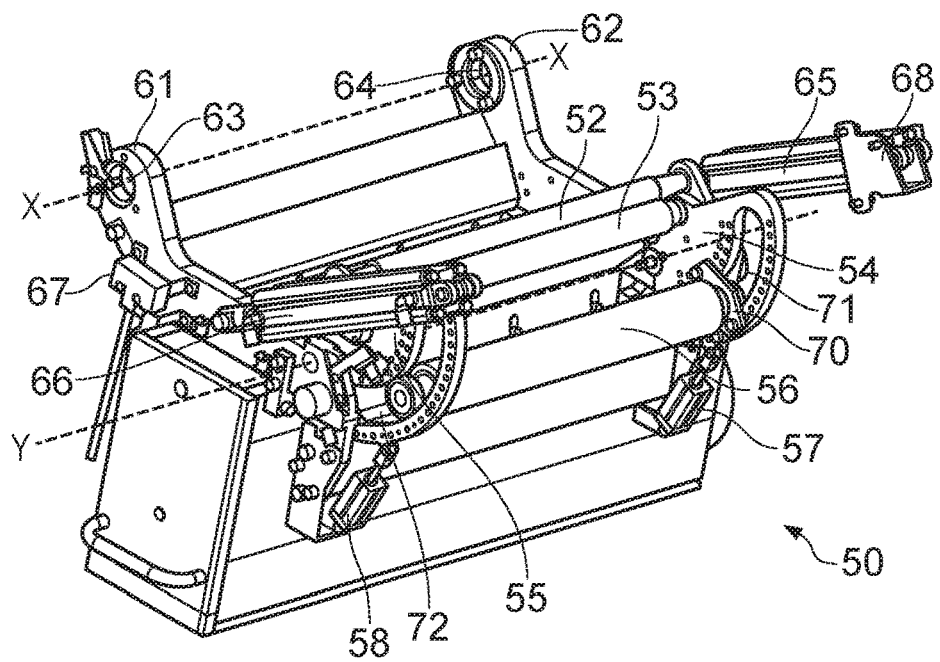
FIG. 10 is a simplified schematic representation of an example movable curing unit.

FIG. 10 shows an example of a movable curing unit 50, which may be used as any of the curing units described above. The movable curing unit 50 in this example comprises a first arm 54 and a second arm 55. The first and second arms 54, 55 are located on opposing ends of the movable curing unit 50. The first and second arms 54, 55 each comprise an aperture 71, 72, respectively, for receipt of a foil transfer roller 56. The foil transfer roller 56 may be an idler roller which does not actively drive the foil. In this example, the foil transfer roller 56 is secured to each arm 54, 55 by a securing mechanism (for example the mechanism 70 shown for arm 54). In one example, the foil transfer roller 56 may be secured in place via screws etc. The foil transfer roller 56 is movable between a range of different positions within the apertures 71, 72, and therefore is movable between a range of different positions within the arms 54, 55.

The movable curing unit 50 in this example comprises a first arm piston 57 and a second arm piston 58. The first arm piston 57 connects one side of the movable curing unit 50 to the first arm 54. The second arm piston 58 connects one side of the movable curing unit 50 to the second arm 55.

In this example, the movable curing unit 50 comprises a foil transfer roller 53 which is connected to, and connected between, each arm 54, 55. The movable curing unit 50 comprises a foil transfer roller 52, and, in use of the movable curing unit 50 in a foil deposition apparatus, a nip may between the foil transfer roller 52 and a foil transfer roller of the apparatus (for example, a foil transfer roller 21, which may be a temperature controlled (e.g. water cooled) foil transfer roller, as described above. The first and second pistons 57, 58 are to move each arm 54, 55 about axis Y.

In use, a foil is advanced between the foil transfer roller 52 and a guide roller 53, and around the foil transfer roller 56. The direction of the foil is changed by repositioning the foil transfer roller 56 in the apertures 71, 72 of the arms 54, 55. Hence, the direction of travel of a foil is adjustable.

In this example, the movable curing unit 50 comprises two limbs, 61, 62. Each limb 61, 62 comprises a cavity 63, 64 respectively, which in this example align. The alignment of each limb 61, 62 and each cavity 63, 64 defines a longitudinal axis X which extends through each cavity 63, 64, of each limb 61, 62. The movable curing unit 50 is moveable, for example pivotable, about the axis X. For example, a shaft may extend through the cavities 63, 64 and the movable curing unit 50 may be movable about the shaft.

In this example, the movable curing unit 50 comprises a first unit piston 65 and second unit piston 66. Movement of the two pistons 65, 66 actuates the movable curing unit 50 to move about the axis X. Each piston 65, 66 comprises a fastening mechanism (for example fastening mechanism 68 of first unit piston 65) which enables the movable curing unit 50 to be fastened to another article. Movement of the pistons 65, 66 actuates movable curing unit 50 to move about the axis X relative to another article. Movement of the pistons 65, 66 may actuate movable curing unit 50 to move to between a first and second position. In the first position, movable curing unit 50 is adjacent to the web and in the second position, movable curing unit 50 is remote from the web. In the first position, movable curing unit 50 drives the foil (or a releasable layer thereof), for example via at least one of foil transfer rollers 52, 53, on a path that converges to the web path, and in the second position, movable curing unit 50 drives a foil, for example via at least one of foil transfer rollers 52, 53, on a path that diverges from a web path.

In use, the movable curing unit 50 drives a foil comprising a releasable and a nonreleasable layer on a foil path, and the foil transfer rollers 52, 53 act as a peeler at which a releasable foil layer may be separated from a nonreleasable foil layer of the foil.

The movable curing unit 50 in this example comprises a sensor 67. The movable curing unit 50 may comprise at least two sensors. In one example, a sensor may function to sense if the movable curing unit 50 is positioned correctly (for example in a first or second position). In another example, the sensor 67 may be a flow sensor to determine if the flow of a foil or a web is advancing correctly, etc.

The foil transfer rollers 52, 53 may have diameters of 20 mm or 30 mm. The nip created by the foil transfer roller 52, and the location of foil transfer roller 56 changes the nip force. The nip force created by the foil transfer rollers 52 may be between 0 and 18 kg, at 5 kg tension, at a first location of the foil transfer roller 56. The nip force created by the foil transfer rollers 52 may be between 0 and 8.5 kg, at 5 kg tension, at a second location of the foil transfer roller 56. In one example the foil transfer roller 56 may be moveable between nine different mounting locations within the arms 54, 55. One, or both, of the foil transfer rollers may have a parallelism of 150 μm/m.

In one example, at least one of the foil transfer rollers 52, 53 may have a hardness of between 50 and 55 Shore. In another example, at least one of the foil transfer rollers 52, 53 may have a hardness of between 85 and 90 Shore.

The first unit piston 65 and the second unit piston 66 may be compact cylinder, double acting pistons. At least one of the first and second unit pistons 65, 66 may have at least one of: a bore diameter of 32 mm and a stroke length of 175 mm. At least one of the pistons 65, 66 may comprise an air speed controller. In one example the unit 50 may comprise a bumper (for example a rubber bumper) that the pistons may abut when actuated.

The first and second pistons 57, 58 may be smooth cylinder, double acting pistons. At least one of the first and second pistons 57, 58 may have at least one of: a bore diameter of 12 mm, a stroke length of 25 mm, and a minimum operating pressure of 0.3 bar. Movement of the first and second pistons 57, 58 may be controllable from an application, for example a smart device or screen. In one example pistons 57, 58 may engage. In one example, movable curing unit 50 may comprise a screen for control of the movable curing unit 50. Screen may be to control movement of the unit 50 between first and second positions, or the position of any one of rollers 52, 53, 56 of the unit 50. A photoelectric sensors may be provided for measuring the proximity of a curing device within the movable curing unit 50 to a foil being advanced by the roller 52. In one example a photoelectric sensor may be provided to measure the nip created by rollers 52, 53 (for example the distance between rollers 52, 53).

Figure 11A:
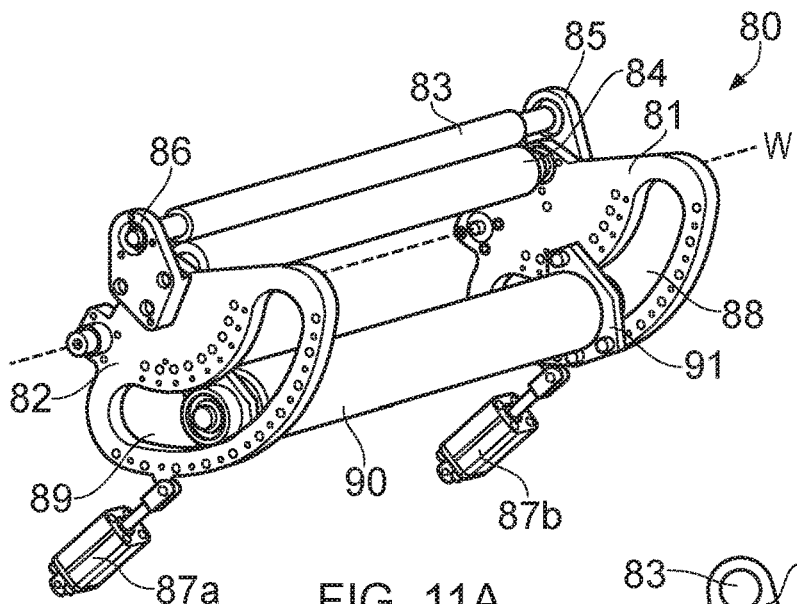
FIGS. 11A and 11B are simplified schematic representations of an example component of a movable curing unit.
Figure 11B:
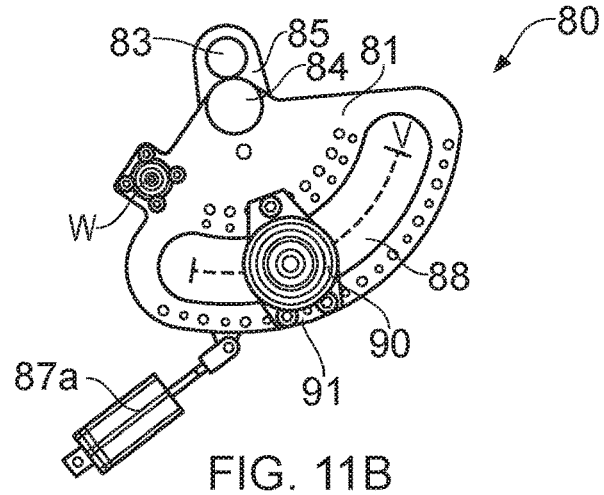

FIGS. 11A and 11B show schematically an example component 80 of a movable curing unit. Component 80 in this example comprises a first arm 81 and a second arm 82. A foil transfer roller 83 is disposed between two holders, a first holder 85 and a second holder 86. The first holder 85 is secured to the first arm 81 and the second holder 86 is secured to the second arm 82. A foil transfer roller 84 is disposed between the first and second arms 81, 82.

A first arm piston 87*a* moves the first arm 81 and a second arm piston 87*b* moves the second arm 82. Each arm 81, 82 is movable about the axis W. The component 80 is therefore be movable about axis W.

The first arm 81 comprises a cavity 88 and the second arm 82 comprises a cavity 89. A foil transfer roller 90 is disposed through each cavity and extends between each arm 81, 82. The foil transfer roller 90 is secured to each arm 81, 82, for example via the securing mechanism 91. The foil transfer roller 90 is movable within the cavities 88, 89 between a range of positions. The range of positions of the foil transfer roller 90 within the cavity 88 is shown by the dotted line V (which indicates the range of positions within the cavity 88 of the centre of the foil transfer roller 90).

Movement of the foil transfer roller 90 within the cavity 88 (or cavities 89, 89) may be manual and may be actuated by unscrewing the foil transfer roller 90 from the arms 81, 82, repositioning the foil transfer roller 90 within the cavity 88 (or cavities 89) and then re-screwing the foil transfer roller 90 to the arms 81, 82 to fix the foil transfer roller 90 in place. In one example, movement of the foil transfer roller 90 within cavity 88 (or cavities, 88, 89) may be automatic.

Figure 12A:
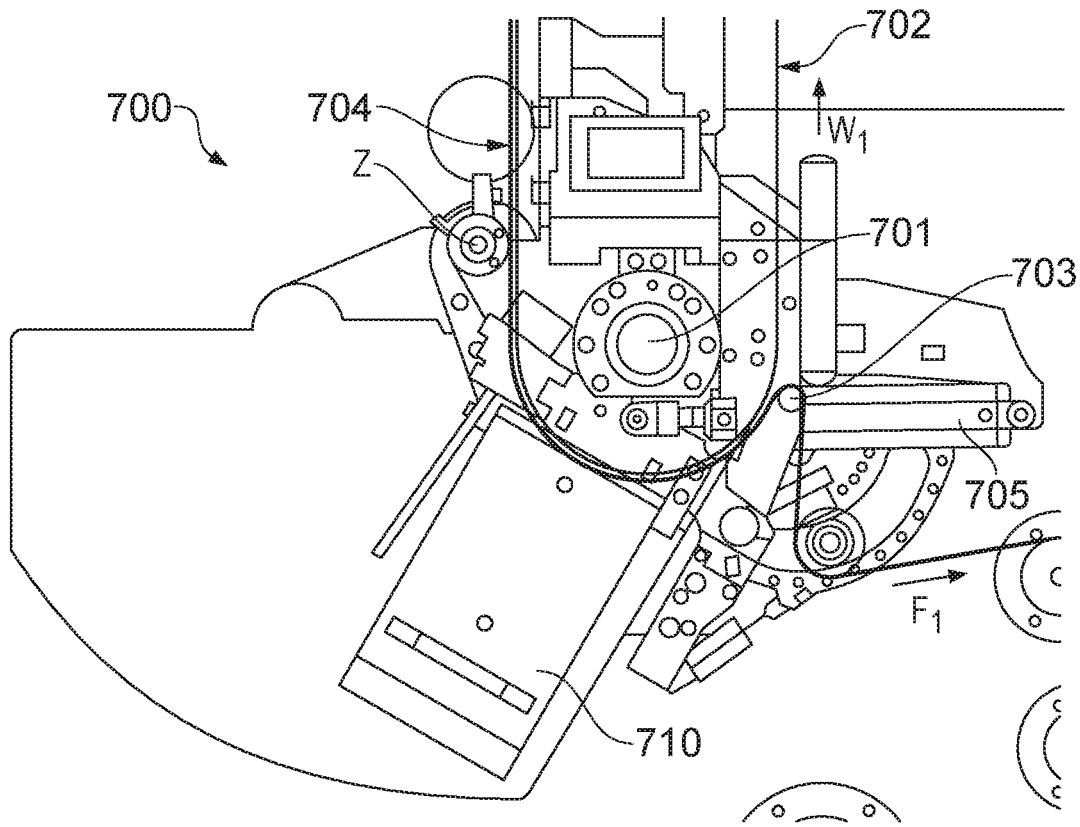
FIGS. 12A and 12B are simplified schematic representations of an example foil deposition apparatus.
Figure 12B:
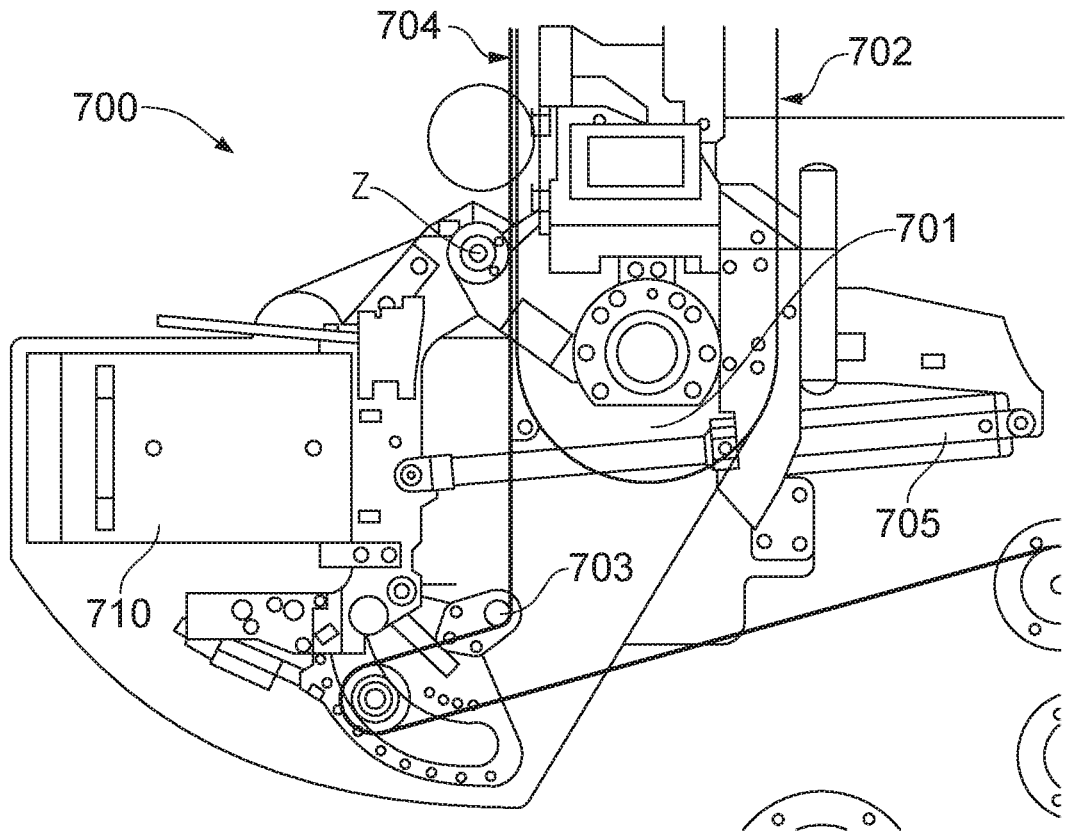

FIGS. 12A and 12B show schematically an example foil deposition apparatus 700.

The foil deposition apparatus 700 in this example comprises a counter roller 701 to drive a web 702 and a movable curing unit 710. The movable curing unit 710 comprises a curing device and a foil guiding unit 703 to guide a foil 704. The curing device may for example comprise a UV lamp or the like.

The movable curing unit 710 is movable between a first position (shown in FIG. 12A) and a second position (shown in FIG. 12B). In the first position, the movable curing unit 710 drives the foil 704 on a path that converges to a web 702 path. In the second position, the movable curing unit 710 drives the foil 704 on a path that diverges from the web 702 path.

The movable curing unit 710 in this example comprises a unit piston 705. Movement of the unit piston 705 actuates the movable curing unit 710 to move between the first position shown in FIG. 12A and the second position shown in FIG. 12B. The movable curing unit 710 is actuated by piston 705 to move about the axis Z.

The foil 704 may comprise a releasable and a nonreleasable foil layer. The foil may be pressed to the web. In one example the foil may be adhered to the web. Any adhesive may be cured by the movable curing unit 710. When in its first position, the movable curing unit 710 is positioned adjacent the web to cure a foil to the web. When the unit is in its first position foil guide unit 703 separates nonreleasable foil layer from releasable foil layer. Releasable foil layer may be adhered to web 702 and may advance with web on the web path W1 and nonreleasable foil layer, having been separated from releasable foil layer, may advance on the foil path F1 which is divergent to the web path W1.

The foil deposition apparatus 700 may comprise a movable foil transfer roller, moveable between a first position to press foil 704 to web 702 and a second position to disengage foil 704 from web 702. In the second position a distance between the foil and the web (or the foil path and the web path) may be achieved. This distance may, in one example, be 5 mm. When apparatus 700 is in its second position the foil and web paths diverge at the counter roller 701. In one example the angle θ of divergence at the counter roller 701 is 59.5 degrees.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A web transfer apparatus comprising:
a web transfer roller to advance a web;
a foil transfer roller to advance a foil, wherein the foil transfer roller is movable between a first position and a second position, wherein in the first position the foil transfer roller is to press the foil against the web and wherein in the second position the foil transfer roller is to disengage the foil from the web; and
a movable curing unit comprising a roller to advance the foil and a curing device, the movable curing unit being movable between a first position adjacent to the web and a second position remote from the web.

2. A web transfer apparatus in accordance with claim 1, wherein the foil comprises a releasable foil layer to adhere to the web and a nonreleasable foil layer, and wherein the roller for advancing the foil is to advance the nonreleaseable foil layer on a path divergent to a path of the releasable foil layer.

3. A web transfer apparatus in accordance with claim 1, further comprising a curing unit adjacent to the web.

4. A web transfer apparatus in accordance with claim 1, further comprising a counter roller for advancing the web and, when the movable curing unit is in its first position adjacent to the web the movable curing unit is adjacent to the counter roller and in its second position remote from the web the movable curing unit is remote from the counter roller.

5. A method comprising:
moving a foil transfer roller for advancing a foil to a position to press the foil against a web;
moving a movable curing unit comprising a curing device and a roller to a position adjacent the web at which the curing device cures the foil to the web; and
advancing the foil by the roller of the movable curing unit.

6. A method in accordance with claim 5, further comprising:
advancing the web on a web path proximate a curing unit.

7. A method in accordance with claim 5, further comprising:
curing a releasable foil layer of the foil to the web;
separating, at the movable curing unit, the releasable foil layer from a nonreleasable foil layer of the foil; and
advancing the releasable foil layer and the nonreleasable foil layer on separate paths.

8. A method in accordance with claim 5, further comprising:
moving the foil transfer roller to a position to disengage the foil from the web;
moving the movable curing unit to a position remote from the web; and
advancing the web on a web path proximate a curing unit.

9. A method in accordance with claim 5, further comprising:
advancing the web on a web path;
moving the foil transfer roller to a position to disengage the foil from the web;
moving the movable curing unit to a position remote from the web; and
advancing the foil on a foil path that diverges from the web path.

10. A print apparatus comprising:
a web transfer roller to drive a web on a web path;
a foil transfer roller to drive a foil, wherein the foil transfer roller is movable between a first position and a second position, wherein in the first position the foil transfer roller is to press the foil against the web and wherein in the second position the foil transfer roller is to disengage the foil from the web;
a movable curing unit comprising a roller to advance the foil and a curing device, the movable curing unit being movable between a first position adjacent to the web and a second position remote from the web; and
a printing unit to print on the web.

11. Print apparatus in accordance with claim 10, wherein the foil comprises a releasable foil layer to adhere to the web and a nonreleasable foil layer, and when the movable curing unit is in its first position to advance the foil on the first path converging to the web path, the movable curing unit is to advance the nonreleasable foil layer on a path divergent to the path of the releasable foil layer.

12. Print apparatus in accordance with claim 10, comprising a curing unit adjacent to the web.

13. Print apparatus in accordance with claim 10, further comprising at least one of a finishing unit and a lamination unit.

14. Print apparatus in accordance with claim 10, wherein the print unit is to print ink on the web.

15. Print apparatus in accordance with claim 10, wherein the print unit is to print adhesive on the web.

* * * * *